United States Patent
Quix et al.

(10) Patent No.: US 9,630,497 B2
(45) Date of Patent: Apr. 25, 2017

(54) IMMOBILIZER SYSTEM FOR A MOTOR VEHICLE

(71) Applicant: FORD GLOBAL TECHNOLOGIES, LLC, Dearborn, MI (US)

(72) Inventors: Hans Guenter Quix, Herzogenrath (DE); David Van Bebber, Aachen (DE); Monika Angst, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/084,314

(22) Filed: Mar. 29, 2016

(65) Prior Publication Data
US 2016/0303967 A1    Oct. 20, 2016

(30) Foreign Application Priority Data
Apr. 16, 2015   (DE) .................. 10 2015 206 846

(51) Int. Cl.
B60K 28/06    (2006.01)
(52) U.S. Cl.
CPC .......... B60K 28/063 (2013.01); B60K 28/066 (2013.01)
(58) Field of Classification Search
CPC ........................... B60K 28/063; B60K 28/066
USPC .......................................................... 701/36
See application file for complete search history.

(56) References Cited

U.S. PATENT DOCUMENTS

| | | | |
|---|---|---|---|
| 8,469,135 B2 | 6/2013 | Kaschner | |
| 9,019,107 B2 | 4/2015 | Biondo et al. | |
| 9,229,905 B1 * | 1/2016 | Penilla | G06F 17/00 |
| 2003/0095046 A1 * | 5/2003 | Borugian | B60R 25/33 340/576 |
| 2008/0221750 A1 * | 9/2008 | Baraty | G07C 5/008 701/31.4 |
| 2012/0268259 A1 * | 10/2012 | Igel | B60R 25/00 340/426.11 |

(Continued)

FOREIGN PATENT DOCUMENTS

| | | |
|---|---|---|
| DE | 102004003019 A1 | 8/2004 |
| WO | 2012041505 A1 | 4/2012 |

OTHER PUBLICATIONS

German Patent and Trademark Office, Search Report for the corresponding German Patent Application No. 10 2015 206 846.3 dated Sep. 1, 2015.

(Continued)

*Primary Examiner* — McDieunel Marc
*Assistant Examiner* — James E Stroud
(74) *Attorney, Agent, or Firm* — Frank A. MacKenzie; Brooks Kushman P.C.

(57) ABSTRACT

An immobilizer system for a motor vehicle having an starter mechanism and a substance detector for detecting impairing drugs/substances in a driver's bode, the allowing the vehicle to be started/operated only when the substance detector delivers a result which is below a limit value. An electronic controller of the immobilizer system is programmed by the driver to pre-specify which restrictions the starter mechanism is subject to if the substance detector delivers a positive test result (above a limit level). The immobilizer may be programmed to either a) prevent operation of the vehicle, or b) allow operation but present a notification to the driver. The driver may set a future time interval during which a selection of option a) cannot be changed by the driver.

18 Claims, 2 Drawing Sheets

(56) References Cited

U.S. PATENT DOCUMENTS

2014/0231166 A1* 8/2014 Miller .................. B60W 40/08
180/272

OTHER PUBLICATIONS

German Patent and Trademark Office, Examination Report for the corresponding German Patent Application No. 10 2015 206 846.3 dated Sep. 1, 2015.

* cited by examiner

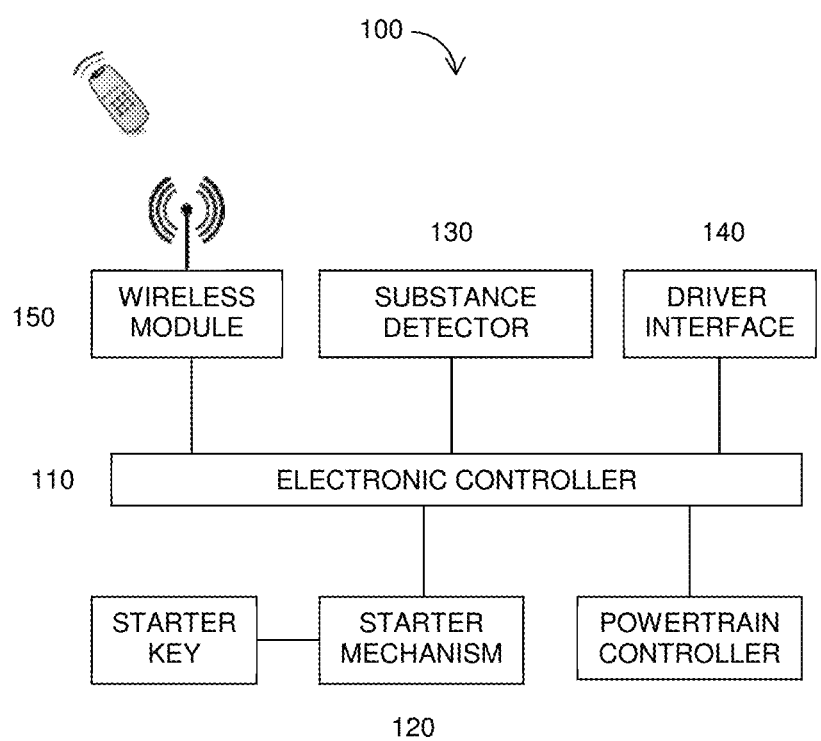

IMMOBILIZER SYSTEM FOR A MOTOR VEHICLE

CROSS-REFERENCE TO RELATED APPLICATIONS

This application claims foreign priority benefits under 35 U.S.C. §119(a)-(d) to DE 10 2015 206 846.3 filed Apr. 16, 2015, which is hereby incorporated by reference in its entirety.

TECHNICAL FIELD

This disclosure relates to an immobilizer system for a motor vehicle having an starter mechanism and a detector for testing for the presence of impairing substances (such as alcohol or other drugs) in the body/system of a person attempting to operate the vehicle, wherein the starter mechanism is designed to be disabled when the substance detector delivers a result which is above a limit value.

BACKGROUND

It is generally known to equip a motor vehicle with an alcohol and/or drug detector that interfaces with appropriate system(s) of the vehicle (such as the starter and/or ignition system) in order to prevent operation by a driver who is determined to be impaired by alcohol and/or other drugs in his/her body. Such a device/system is commonly referred to as a vehicle immobilizer or a starter interlock.

By way of example, EP 1 601 548 B1 discloses an immobilizer system for a motor vehicle having a key and a separate external analysis unit, where the vehicle can only be started with the key when the alcohol or drug content of the sample examined is below a pre-specified limit. This ensures that both the key is present and that the alcohol and/or drug test is negative.

DE 60 2004 013 379 T2 discloses a system for starting a car, where the system comprises a first key with which a door of the car can be opened and an ignition of the car can be operated, a second key and an immobilizer of the car, which immobilizer receives a message indicating the presence of the first key which has been inserted into the ignition, and which immobilizer prevents the car from being started before an OK signal has been received from the second key, where the alcohol level of a driver of the car is determined by the second key and an OK signal is transmitted from the second key to the immobilizer only when the alcohol level is below a pre-specified value, where the immobilizer allows operation of the ignition by means of the first key in the usual way when the second key has transmitted the OK signal.

DE 10 2007 047 709 A1 discloses a corresponding device in which, however, it is possible to bypass or decommission said device, for example in emergency situations. However, this is logged in order to prevent regular misuse.

However, there is still a demand for an immobilizer system which allows more flexible handling, for example which do not require an alcohol and/or drug test from everyone and do not take away all control from the driver, so that said driver is encouraged to use the system sensibly.

SUMMARY

The immobilizer system disclosed provides can be set in a variable manner in respect of carrying out an alcohol and/or drug test and in respect of the restrictions applied in the event of a positive test result.

It has been noticed that, when an immobilizer system comprises a programming option by means of which the driver can pre-specify which restrictions the vehicle starter mechanism is subject to if the impairing substance detector delivers a result which is above a limit value, it is possible to achieve a greater degree of acceptance by the driver since control is not taken away from said driver since he himself can actively fix the restrictions of the system.

An impairing substance detector is linked to the control electronics of the vehicle and integrated into the vehicle, so that the driver has the option of activating the system in advance. In the process, said driver can decide whether the system, for example, prevents starting of the engine (an "operation-inhibit" condition) or, for example, only warns the driver that his alcohol level is too high (an "operation-allowed" condition). The system is activated, for example, when the vehicle is turned off. If the driver, for example, expects to possibly consume alcohol, he/she can activate the system with different functions. However, the system can also be activated by other people (for example parents of young drivers). In this case, it would also be feasible for the system to be permanently active until the person in question deactivates the system again (for example with a password).

The programming option may comprise deactivating the substance detector, that is to say the driver etc. can deactivate the system.

Provision can also be made for the programming option to comprise preventing subsequent deactivation, that is to say the driver etc. cannot subsequently deactivate a prior selection of the operation-inhibit condition once it is activated, for example after visiting a bar.

The programming option can also comprise activation in a pre-specified time period, so that, for example, the system is activated during the evening hours when the driver expects to visit a bar (cf. above), but is no longer activated the next morning. The activation time period is pre-specified by specifying a start time and a time interval for the period, using the driver interface unit.

When the system is activated, the vehicle can therefore be started only after a drug and/or alcohol test has been performed on the driver, but the restrictions in the event of an excessively high test result (certain level above the limit value) can be selected (either operation-inhibit or operation-allowed condition) or pre-specified by programming, specifically in advance.

Depending on the legal requirements, it may additionally be expedient to permit the limit value to be pre-specified and/or changed. For example, the driver may deliberately fix the limit value of the system below the legal limit value if the legal limit value is too high in the opinion of the driver.

As an alternative or in addition, the programming option can comprise pre-specifying the display of notifications if the substance detector delivers a result which is above a limit value, so that the driver is only warned when, for example, the specific substance level is too high. In other words, the vehicle can be started and the driver is only notified that the level is high.

The programming option may also comprise sending a notification to a pre-specifiable person if the substance detector delivers a result which is above a limit value. In this way, it is possible, for example, for parents or superiors to receive an SMS, email, voice message etc. if children, relatives, employees etc. are using the vehicle alone.

The substance detector is preferably integrated into the vehicle.

The detector is advantageously integrated such that only the driver can carry out the test. The detector can also be linked to a control center, so that the probability of a person other than the driver taking the test is minimized. This may involve, for example, coupling to the driver's seat contact, so that the test is rejected when the seat is no longer occupied by a person (for example a person gets out of the seat after taking the test, to be replaced by someone who has not been tested).

A camera which observes the interior could also be used in order to monitor the test process. A camera of this kind could also be used to identify the driver in order to prevent the driver possibly swapping places with someone else.

The substance detector can also be an external mobile detector. This has the advantage that simple handling with annual calibration etc. is possible and the entire vehicle does not have to be taken to a garage. In this case, the substance detector can be connected to the immobilizer system by means of an intelligent mobile telephone or other wireless communication device/system. Basically, an app which transmits its data to the vehicle in a wireless manner, for example by means of Bluetooth etc., is used in this case. As an alternative, the detector can also be integrated into the vehicle.

In this document, an "impairing substance" is intended to be understood to include all legal and illegal substances which can impair driving ability if present in required quantities in the driver's body. Accordingly, impairing substances within the meaning of this invention includes alcohol and legally obtainable medicines if they impair driving ability on their own or in combination with other substances and/or factors.

The vehicle starter mechanism may have an emergency starting feature which allows the limit value or the alcohol and/or drug test to be entirely bypassed in the event of an emergency. This ensures that the vehicle can be moved in the event of an emergency. To this end, it can also be provided, depending on the design, that only a low maximum speed is pre-specified for the vehicle. This pre-specified maximum speed can also be made depending on the measured values from the alcohol and/or drug test, so that slow driving would be possible despite there being an emergency situation and a relatively low alcohol level. The emergency starting apparatus should be designed such that use for the driver is simple on the one hand, but also constitutes a certain obstacle on the other hand, in order to largely prevent misuse of the emergency starting apparatus. This could be achieved, for example, by a warning lamp only being deactivated again after the vehicle has been taken to a garage.

In a further feature, a biometric identification unit is provided. Therefore, in addition to the starter key, the identity of the driver can be identified. To this end, the biometric identification unit can be formed by an intelligent mobile telephone which is connected to the immobilizer system. Therefore, an appropriate app can be used once again.

If the starter/interlock mechanism is designed to be locked for a pre-specifiable time period, it is possible, in the event of a positive alcohol and/or drug test, for the vehicle to be immobilized for a pre-specified time period, until it can be expected that the alcohol and/or the drugs will have lost their effect.

Further features and details of the invention can be gathered from the following description of the drawings, in which:

BRIEF DESCRIPTION OF THE DRAWINGS

FIG. 2 shows a schematic block diagram of an immobilizer system.

DETAILED DESCRIPTION

Figure 1:
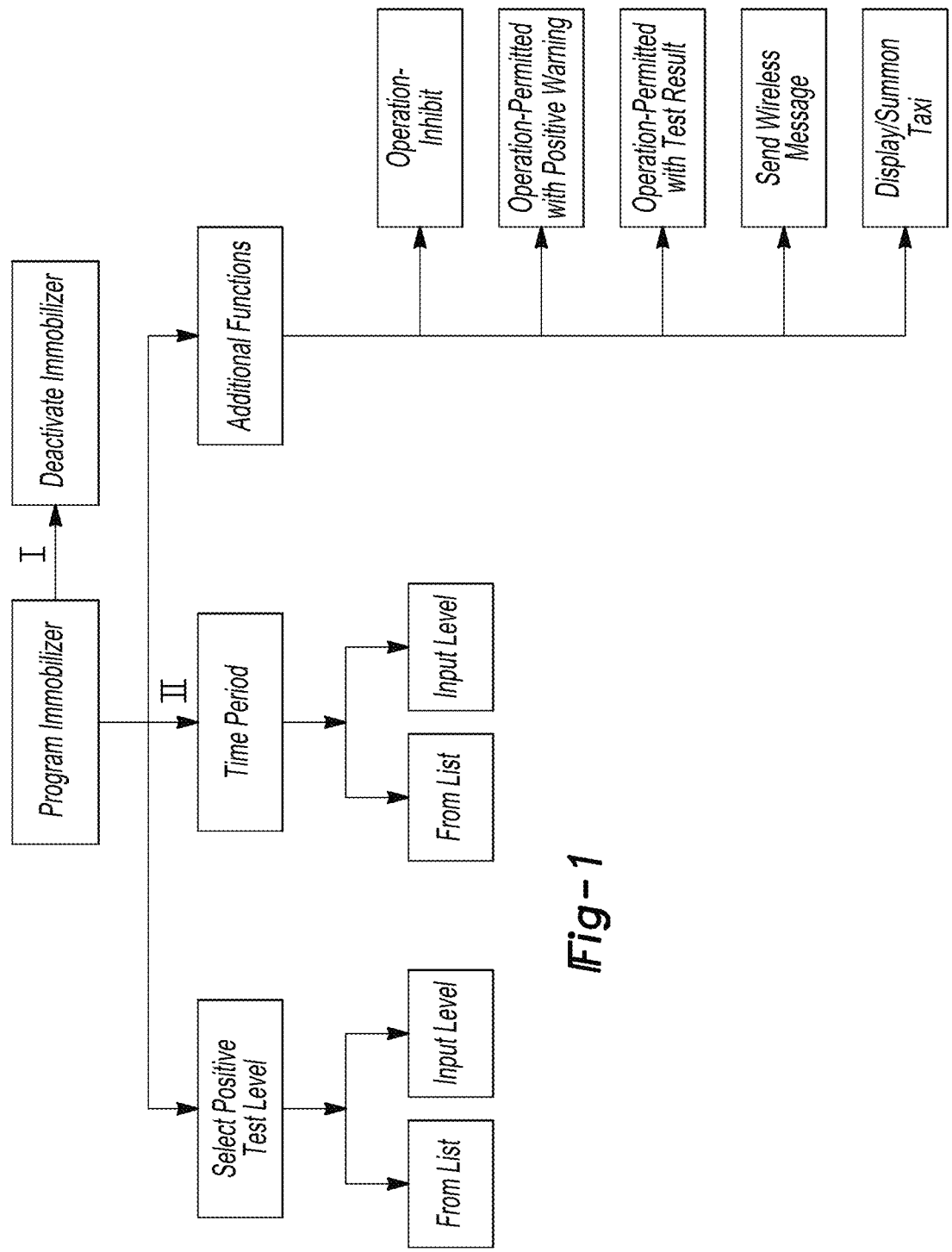
FIG. 1 shows a schematic block diagram of the programming method of an immobilizer system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Programming, which is denoted by 1 overall, of an immobilizer system of a passenger car is shown in FIG. 1. Reference is made to an immobilizer system 100 as shown schematically in the functional block diagram FIG. 2.

The driver (or another person) can make a decision in initial step A that he wishes to program an electronic controller 110 of the immobilizer system (100) in respect of restricting the activation of the starter mechanism 120 in accordance with the result from the substance detector 130. Programming may be accomplished using a driver interface unit 140 (see FIG. 2), which may, for example, may comprise a visual display (with associated buttons or touch-screen for making inputs) and/or a voice recognition system.

The term "starter" as used herein is not to be construed as requiring that the subject vehicle has an internal combustion engine. Rather, the term is used to more generally refer to starting operation of (or "powering-up") the powertrain of a vehicle having any type of motive unit/system, to include hybrid-electric, battery-electric, fuel cell, etc.

In the process, said driver (or other person) can initially program that he would like to completely deactivate the substance detector (step I). Therefore, the starter mechanism would always be activated (B).

As an alternative, said driver (or other person) can program or pre-specify that the immobilizer is activated, and therefore the activation of the starter mechanism depends on the result from the substance detector (step II).

In this case, the driver then has further options to specify the programming or pre-specifications.

For example, the driver can select or pre-specify the limit level of the tested-for substance in the driver's body that will constitute a positive result from the substance detector (C). Depending on legal requirements, said driver may in this case select the value from a pre-programmed list (C1) or pre-specify a value not available from the list (C2). It is possible for the driver to select or pre-specify a multiple of limit levels that result in different function of the system, as programmed in the steps described below. For example, the driver may select a first relatively low limit level that will result in a warning/notification (but still an operation-allowed condition), and a second relatively higher limit level that results in an operation-inhibit condition.

Furthermore, the driver can pre-specify the activation time period of the substance detector (D). In this case, said driver can pre-specify permanent activation (D1) or a time period for activation (D2). A time period comprises a start time (in the future) for the period, and a duration of the period.

In addition, the driver can determine or program further functions or restrictions (E).

The functions E are independent of one another and can be programmed separately.

In the case of function E1, the operation-inhibit condition allows the vehicle to be started/operated only when a test for an impairing substance has been carried out by the detector and the test result is not positive ("not positive" meaning the result does not exceed a pre-specified limit level (in this case the limit level can be pre-specified or have been determined by a person activating the system; see above).

In the case of function E2, the operation-permitted condition allows the vehicle to be started/operated only after a test for impairing substances is carried out. Nevertheless, the engine/motor can be started (and the vehicle subsequently driven by the driver) in spite of a positive result. However, the system notifies or warns the driver that the level of impairing substance(s) detected by the test is over the limit selected in step C above and therefore may be too high for safe vehicle operation.

In the case of function E3, the starter mechanism allows the vehicle to be started/operated only after a test for impairing substances is carried out. The driver is only informed of the result of the test, for example on a display or verbally, but without reference to any limit level.

In the case of function E4, the starter mechanism allows the vehicle to be started/operated only after a test for impairing substances is carried out. This system sends a wireless message via the wireless communication module 150 to a predefined address (for example by SMS) when an elevated alcohol or drug level is measured in the car.

In the case of function E5, the starter mechanism allows the vehicle to be started/operated only after a test for impairing substances is carried out. If the test result is positive (the measured value is too high relative to the pre-selected limit), the system can (if network access is available) automatically display possible taxi services (or other passenger transport services) in the surrounding area or automatically call a taxi/transport service directly via the wireless communication module 150. The automatic request for a taxi/transport service may include the present location of the vehicle.

Functions E1-5 can be activated for a pre-specified time, so that said functions can no longer be deactivated in this time period or can be deactivated in this time period only using a pre-specified password.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An immobilizer system for a motor vehicle comprising:
   a detector configured to measure a level of an impairing substance in a body of a driver;
   an interlock configured to alternatively allow and prevent operation of the vehicle; and
   a controller programmed to
      during a pre-programmed time period, require a negative test result from the detector before allowing operation of the vehicle, and
      outside of the pre-programmed time period, allow operation of the vehicle without requiring use of the detector.

2. The immobilizer system of claim 1, wherein the controller is further operative to deactivate the immobilizer system.

3. The immobilizer system of claim 1, wherein the controller is further operative to allow the driver to pre-specify a limit level of the impairing substance corresponding to the positive test.

4. The immobilizer system of claim 1 wherein the controller is further operative to send a notification to a pre-specified address via a wireless communication mode in response to the positive test result.

5. The immobilizer system of claim 4, wherein the notification comprises a request to a passenger transport service to dispatch a second vehicle to a current location of the vehicle.

6. An immobilizer system for a motor vehicle comprising:
   a controller coupled to a detector configured to measure a level of an impairing substance in a body of a driver, the controller programmed to, during a pre-programmed time interval, allow operation of the vehicle only after receiving a signal from the detector indicating a negative test result from the detector.

7. The immobilizer system of claim 6, wherein the controller is further operative to deactivate the immobilizer system.

8. The immobilizer system of claim 6, wherein the controller is further operative to allow the driver to pre-specify a limit level of the impairing substance corresponding to the operation-inhibit condition.

9. The immobilizer system of claim 6 wherein the controller is further operative to send a notification to a pre-specified address via a wireless communication if the impairing substance is detected in the driver's body.

10. The immobilizer system of claim 9, wherein the notification comprises a request to a passenger transport service to dispatch a second vehicle to a current location of the vehicle.

11. A method of operating an immobilizer system for a vehicle comprising:
    via a controller, providing a driver with an option to select between, upon a positive test for an impairing substance in the driver's body,
      a) preventing vehicle operation, and
      b) allowing vehicle operation and generating a notification indicating the positive test results, and
    via the controller, preventing the driver from changing the selection of option a) during a time period designated by the driver.

12. The method of claim 11, wherein the driver may deactivate the immobilizer system.

13. The method of claim 11 further comprising preventing deactivation of the immobilizer system during the time period.

14. The method of claim 11, wherein the system is programmable by the driver to pre-specify a limit level of the impairing substance which results in vehicle operation being inhibited.

15. The method of claim 11, further comprising sending a notification to a pre-specified address via a wireless communication if the impairing substance is detected in the driver's body.

16. The method of claim 15, wherein the notification comprises a request to a passenger transport service to dispatch a second vehicle to a current location of the vehicle.

17. The immobilizer system of claim 1, wherein the controller is further programmed to, during the pre-programmed time period, disable overriding of the requirement for the negative test result before allowing operation of the vehicle.

18. The immobilizer system of claim 6, wherein the controller is further programmed to, during the pre-programmed time period, disable overriding of a requirement to allow operation of the vehicle only after receiving the signal from the detector indicating the negative test result from the detector.

\* \* \* \* \*